US 10,570,748 B2

(12) United States Patent
Shenny et al.

(10) Patent No.: US 10,570,748 B2
(45) Date of Patent: Feb. 25, 2020

(54) IMPINGEMENT COOLING ARRANGEMENT FOR AIRFOILS

(71) Applicant: United Technologies Corporation, Farmington, CT (US)

(72) Inventors: Jason Shenny, West Hartford, CT (US); Jeffrey T. Morton, Manchester, CT (US); Alberto A. Mateo, Vernon, CT (US); San Quach, Southington, CT (US); Gregory Anselmi, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/866,557

(22) Filed: Jan. 10, 2018

(65) Prior Publication Data
US 2019/0211689 A1    Jul. 11, 2019

(51) Int. Cl.
*F01D 5/18* (2006.01)
*F04D 29/32* (2006.01)
*F04D 29/58* (2006.01)

(52) U.S. Cl.
CPC .............. *F01D 5/186* (2013.01); *F01D 5/187* (2013.01); *F04D 29/324* (2013.01);
(Continued)

(58) Field of Classification Search
CPC .......... F01D 5/186; F01D 5/187; F01D 5/188; F01D 5/18; F01D 5/147; F05D 2260/201; F05D 2240/303
See application file for complete search history.

(56) References Cited

U.S. PATENT DOCUMENTS 5,246,340 A    9/1993    Winstanley et al.
5,263,820 A    11/1993   Tubbs
(Continued)

FOREIGN PATENT DOCUMENTS

EP    2138675     12/2009
EP    2752554     9/2014
(Continued)

OTHER PUBLICATIONS

European Search Report for European Patent Application No. 19150752.4 completed May 14, 2019.

*Primary Examiner* — Richard A Edgar
*Assistant Examiner* — Maxime M Adjagbe
(74) *Attorney, Agent, or Firm* — Carlson, Gaskey & Olds, P.C.

(57) ABSTRACT

An airfoil for a gas turbine engine according to an example of the present disclosure includes, among other things, an airfoil section that has an internal wall and an external wall. The external wall defines pressure and suction sides that extends in a chordwise direction between a leading edge and a trailing edge, a first impingement cavity and a second impingement cavity bounded by the external wall at a leading edge region that defines the leading edge, a first feeding cavity separated from the first impingement cavity and from the second impingement cavity by the internal wall, and a first crossover passage within the internal wall that connects the first impingement cavity and the first feeding cavity. The first crossover passage defines a first passage axis that intersects a surface of the first impingement cavity. A second crossover passage within the internal wall connects to the second impingement cavity. The second crossover passage defines a second passage axis that intersects a surface of the second impingement cavity.

22 Claims, 9 Drawing Sheets

(52) U.S. Cl.
CPC ........ *F04D 29/582* (2013.01); *F05D 2220/32* (2013.01); *F05D 2240/303* (2013.01); *F05D 2260/201* (2013.01); *F05D 2260/202* (2013.01)

(56) References Cited

U.S. PATENT DOCUMENTS

| | | | |
|---|---|---|---|
| 5,271,715 | A | 12/1993 | Zelesky et al. |
| 5,498,133 | A | 3/1996 | Lee |
| 5,624,231 | A | 4/1997 | Ohtomo et al. |
| 7,195,458 | B2 | 3/2007 | Liang |
| 7,520,725 | B1 | 4/2009 | Liang |
| 7,722,326 | B2 | 5/2010 | Beeck et al. |
| 7,862,299 | B1 | 1/2011 | Liang |
| 8,366,395 | B1 * | 2/2013 | Liang .................... F01D 5/186 416/96 R |
| 8,657,576 | B2 | 2/2014 | Tibbott et al. |
| 8,864,469 | B1 | 10/2014 | Liang |
| 2005/0265838 | A1 | 12/2005 | Liang |
| 2006/0002795 | A1 | 1/2006 | Liang |
| 2008/0080979 | A1 | 4/2008 | Brassfield et al. |
| 2009/0162204 | A1 | 6/2009 | Aggarwala et al. |
| 2010/0254824 | A1 | 10/2010 | Naik et al. |
| 2013/0081408 | A1 | 4/2013 | Molter et al. |
| 2013/0156602 | A1 | 6/2013 | Santoro et al. |
| 2014/0193273 | A1 | 7/2014 | Bommanakatte et al. |
| 2016/0010463 | A1 | 1/2016 | Quach |
| 2016/0024938 | A1 | 1/2016 | Slavens et al. |
| 2016/0319674 | A1 * | 11/2016 | Gleiner .................... B22C 9/06 |

FOREIGN PATENT DOCUMENTS

| | | |
|---|---|---|
| GB | 2460936 | 12/2009 |
| WO | 2009087346 | 7/2009 |

\* cited by examiner

IMPINGEMENT COOLING ARRANGEMENT FOR AIRFOILS

BACKGROUND

This disclosure relates to cooling for a component of a gas turbine engine, including a component having one or more impingement cooling features.

Gas turbine engines can include a fan for propulsion air and to cool components. The fan also delivers air into an engine core where it is compressed. The compressed air is then delivered into a combustion section, where it is mixed with fuel and ignited. The combustion gas expands downstream and drives turbine blades. Static vanes are positioned adjacent to the turbine blades to control the flow of the products of combustion. The blades and vanes are subject to extreme heat, and thus cooling schemes are utilized for each.

SUMMARY

An airfoil for a gas turbine engine according to an example of the present disclosure includes an airfoil section that has an internal wall and an external wall. The external wall defines pressure and suction sides that extends in a chordwise direction between a leading edge and a trailing edge, a first impingement cavity and a second impingement cavity bounded by the external wall at a leading edge region that defines the leading edge, a first feeding cavity separated from the first impingement cavity and from the second impingement cavity by the internal wall, and a first crossover passage within the internal wall that connects the first impingement cavity and the first feeding cavity. The first crossover passage defines a first passage axis that intersects a surface of the first impingement cavity. A second crossover passage within the internal wall connects to the second impingement cavity. The second crossover passage defines a second passage axis that intersects a surface of the second impingement cavity.

In a further embodiment of any of the foregoing embodiments, the second crossover passage connects the second impingement cavity and a second feeding cavity. The second feeding cavity separates from the first impingement cavity and from the second impingement cavity by the internal wall.

In a further embodiment of any of the foregoing embodiments, the first passage axis intersects the surface of the first impingement cavity adjacent to the pressure side, and the second passage axis intersects the surface of the second impingement cavity adjacent to the suction side.

In a further embodiment of any of the foregoing embodiments, the first crossover passage extends between a first inlet and a first outlet. The second crossover passage extends between a second inlet and a second outlet, and the first inlet is forward of the second outlet with respect to the chordwise direction.

In a further embodiment of any of the foregoing embodiments, the second crossover passage connects the second impingement cavity and the first feeding cavity, and the first outlet is forward of the second inlet with respect to the chordwise direction.

In a further embodiment of any of the foregoing embodiments, the first impingement cavity defines a first volume and the second impingement cavity defines a second volume that is less than the first volume.

In a further embodiment of any of the foregoing embodiments, the airfoil section extends in a spanwise direction from a 0% span position to a 100% span position, and each of an outlet of the first crossover passage and an outlet of the second crossover passage is defined at a span position that is between an 70% span position and the 100% span position.

In a further embodiment of any of the foregoing embodiments, the airfoil is a high lift airfoil.

In a further embodiment of any of the foregoing embodiments, the airfoil is a turbine blade.

In a further embodiment of any of the foregoing embodiments, the airfoil section defines a mean camber line extending between the leading and trailing edges to bisect a thickness of the airfoil section, and a rib separating the first impingement cavity and the second impingement cavity being transverse to the mean camber line.

In a further embodiment of any of the foregoing embodiments, the first passage axis intersects the external wall at an intersection point. The intersection point is between the trailing edge and a gauge point defined by the airfoil.

A core for an airfoil according to an example of the present disclosure includes a first portion that corresponds to a first impingement cavity of a leading edge region of an airfoil, a second portion that corresponds to a second impingement cavity of the leading edge region of the airfoil, a third portion that corresponds to a first feeding cavity of the airfoil, and a fourth portion that corresponds to a second feeding cavity of the airfoil. A first set of connectors couple the first portion and the third portion. The first set of connectors correspond to a first set of crossover passages of the airfoil. A second set of connectors couple the second portion and the fourth portion. The second set of connectors correspond to a second set of crossover passages of the airfoil.

In a further embodiment of any of the foregoing embodiments, the first portion defines a first volume and the second portion defines a second volume that is less than the first volume.

In a further embodiment of any of the foregoing embodiments, the airfoil is a turbine airfoil.

A gas turbine engine according to an example of the present disclosure includes an array of airfoils circumferentially distributed about an engine axis. Each airfoil of the array of airfoils has an airfoil section that has an internal wall and an external wall. The external wall defines pressure and suction sides that extends in a chordwise direction between a leading edge and a trailing edge. The airfoil section has a first impingement cavity and a second impingement cavity bounded by the external wall at a leading edge region that defines the leading edge. A first feeding cavity and a second feeding cavity are separated from the first impingement cavity and from the second impingement cavity by the internal wall. A first set of crossover passages within the internal wall connects the first impingement cavity and the first feeding cavity. Each passage of the first set of crossover passages defines a first passage axis that intersects a surface of the first impingement cavity. A second set of crossover passages within the internal wall connects the second impingement cavity and the second feeding cavity. Each passage of the second set of crossover passages defines a second passage axis that intersects a surface of the second impingement cavity.

A further embodiment of any of the foregoing embodiments includes a compressor section and a turbine section. The array of airfoils are located in at least one of the compressor section and the turbine section.

In a further embodiment of any of the foregoing embodiments, the array of airfoils are rotatable blades.

In a further embodiment of any of the foregoing embodiments, each passage of the first set of crossover passages extends between a first inlet and a first outlet, each passage of the second set of crossover passages extends between a second inlet and a second outlet, and both the first inlet and the first outlet are forward of the second outlet with respect to the chordwise direction.

In a further embodiment of any of the foregoing embodiments, the first impingement cavity defines a first volume and the second impingement cavity defines a second volume that is less than the first volume.

In a further embodiment of any of the foregoing embodiments, facing pressure and suction sides of adjacent airfoils define a throat that corresponds to a gauge point, the throat defined as a minimum distance between the facing pressure and suction sides at a respective span position. The first passage axis of at least some passages of the first set of crossover passages intersects the external wall at an intersection point. The intersection point is within 10% of a distance from the gauge point with respect to a length between the gauge point and one of the leading edge and the trailing edge.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
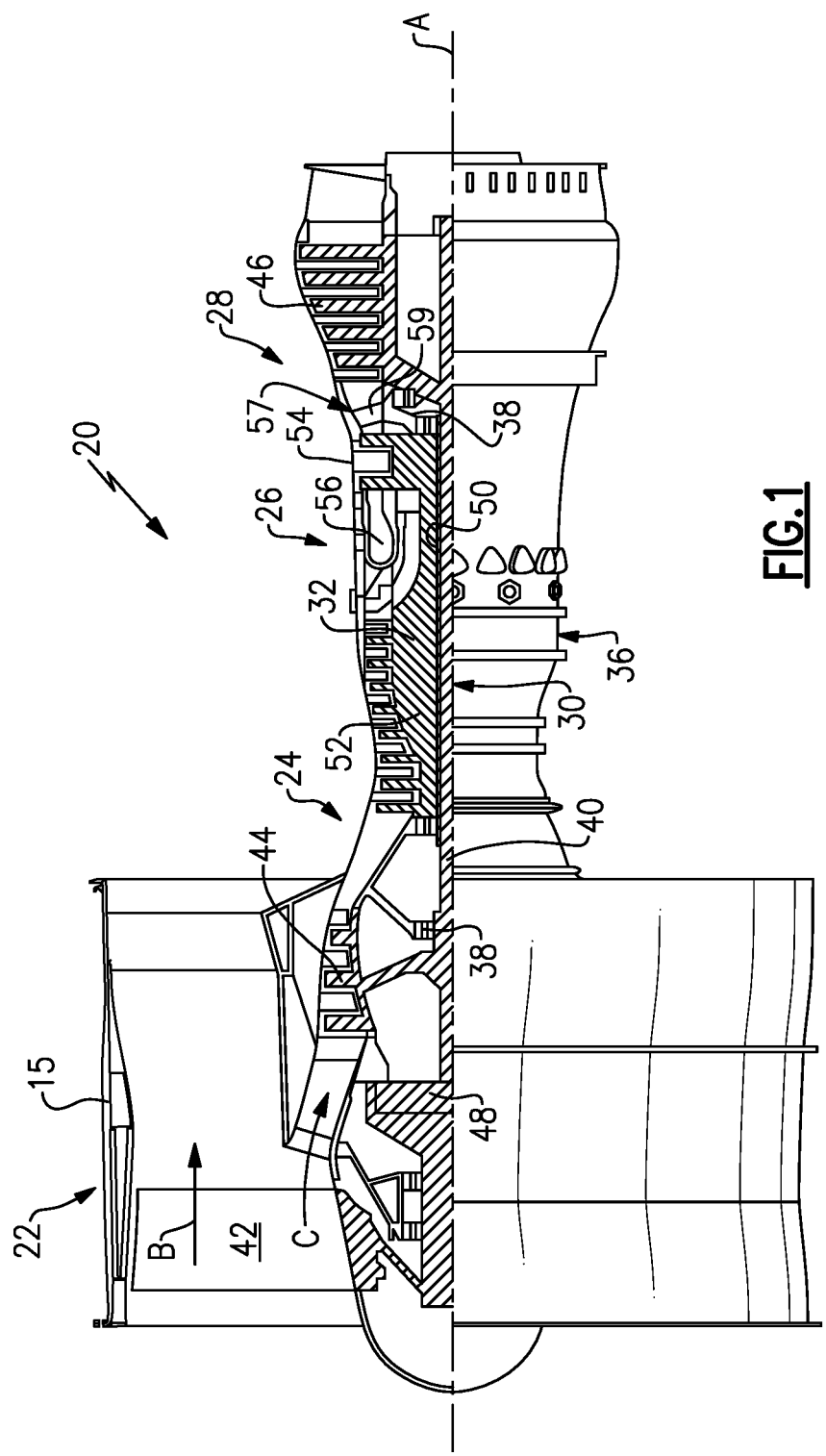
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
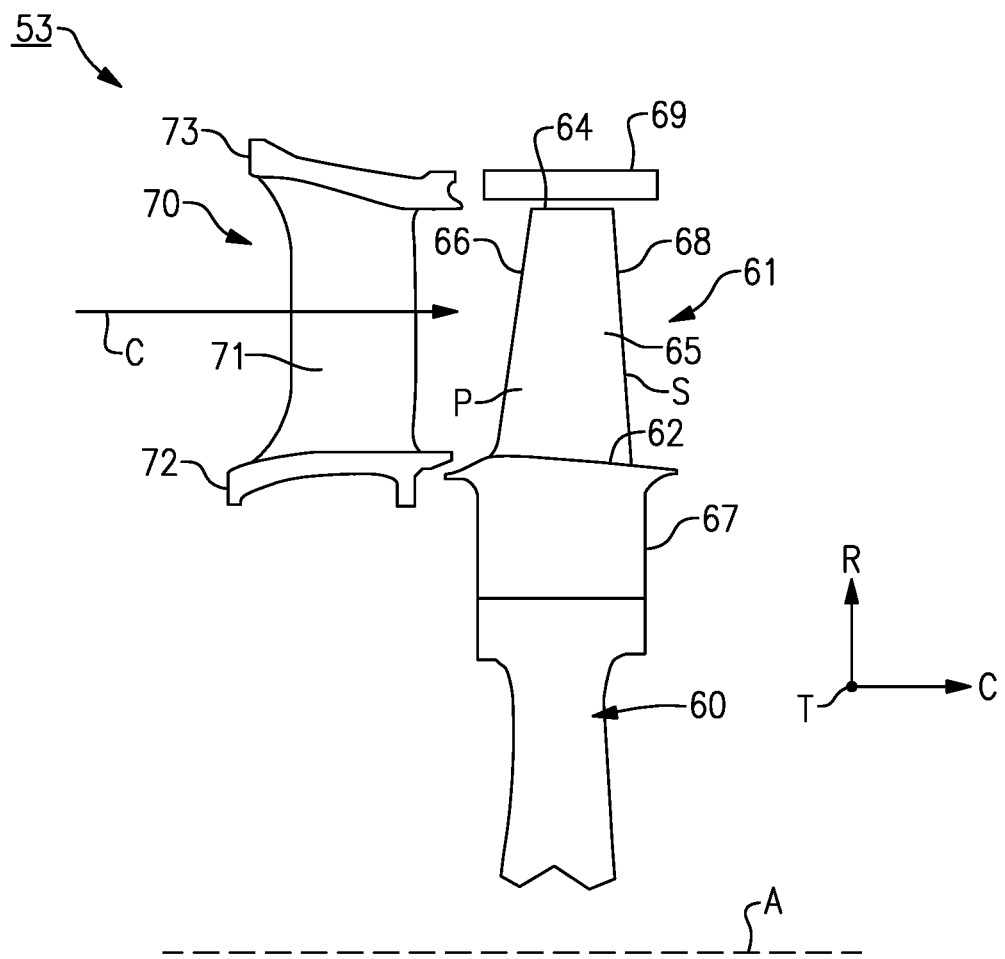
FIG. 2 schematically shows an airfoil arrangement for a section of a gas turbine engine.

FIG. 2 shows selected portions of a section 53 of a gas turbine engine, such as a portion of the compressor section 24 or the turbine section 28 of the engine 20 of FIG. 1. The section 53 includes a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. In this example, each airfoil 61 includes a platform 62 and an airfoil section 65 extending in a spanwise or radial direction R from the platform 62 to a tip 64. The airfoil section 65 generally extends in an axial or chordwise direction C between a leading edge 66 to a trailing edge 68, and in a circumferential or thickness direction T between suction and pressure sides S, P. A root section 67 of the airfoil 61 is mounted to the rotor 60, for example. It should be understood that the airfoil 61 can alternatively be integrally formed with the rotor 60, which is sometimes referred to as an integrally bladed rotor (IBR). The airfoil 61 is rotatable about the central axis A.

A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The section 53 includes multiple airfoils 61, vanes 70, and blade outer air seals 69 arranged circumferentially about the engine axis A. Although the exemplary cooling arrangements discussed in the disclosure primarily refer to a rotatable airfoil 61 or turbine blade, the teachings herein can also be utilized for another portion of the engine 20 including static airfoils such as vane 70 and other portions defining a gas path such as BOAS 69, for example. Also, although the teachings herein primarily refer to the leading edge or leading edge region, other portions of the airfoil can benefit from the teachings herein, including trailing edge regions.

Figure 3:
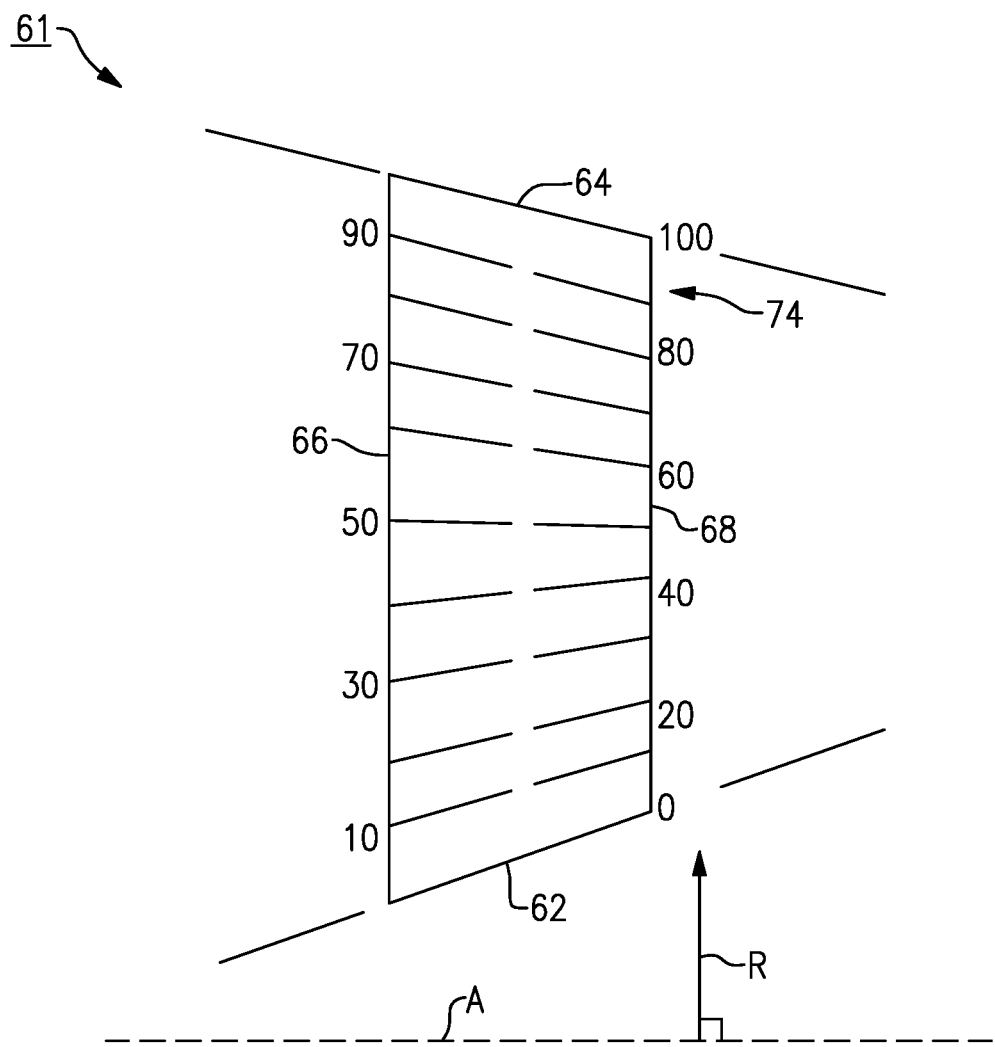
FIG. 3 is a schematic view of airfoil span positions.

Referring to FIG. 3, span positions are schematically illustrated from 0% to 100% in 10% increments to define a plurality of sections 74. Each section 74 at a given span position is provided by a conical cut that corresponds to the shape of segments of the core flow path C (FIG. 1), as shown by the large dashed lines. In the case of an airfoil 61 with an integral platform, the 0% span position corresponds to the radially innermost location where the airfoil 61 meets the fillet joining the airfoil section 65 to the platform 62. Span position may be relative to the platform 62, such as 0% span at the platform 62 and 100% span at the tip 64, for example. In the case of an airfoil 61 without an integral platform, the 0% span position corresponds to the radially innermost location where the discrete platform 62 meets the exterior surface of the airfoil section 65 (or the inner platform 72 of vane 70). A 100% span position corresponds to a section of the airfoil 61 at the tip 64 (or the outer platform 73 of vane 70).

Figure 4A:
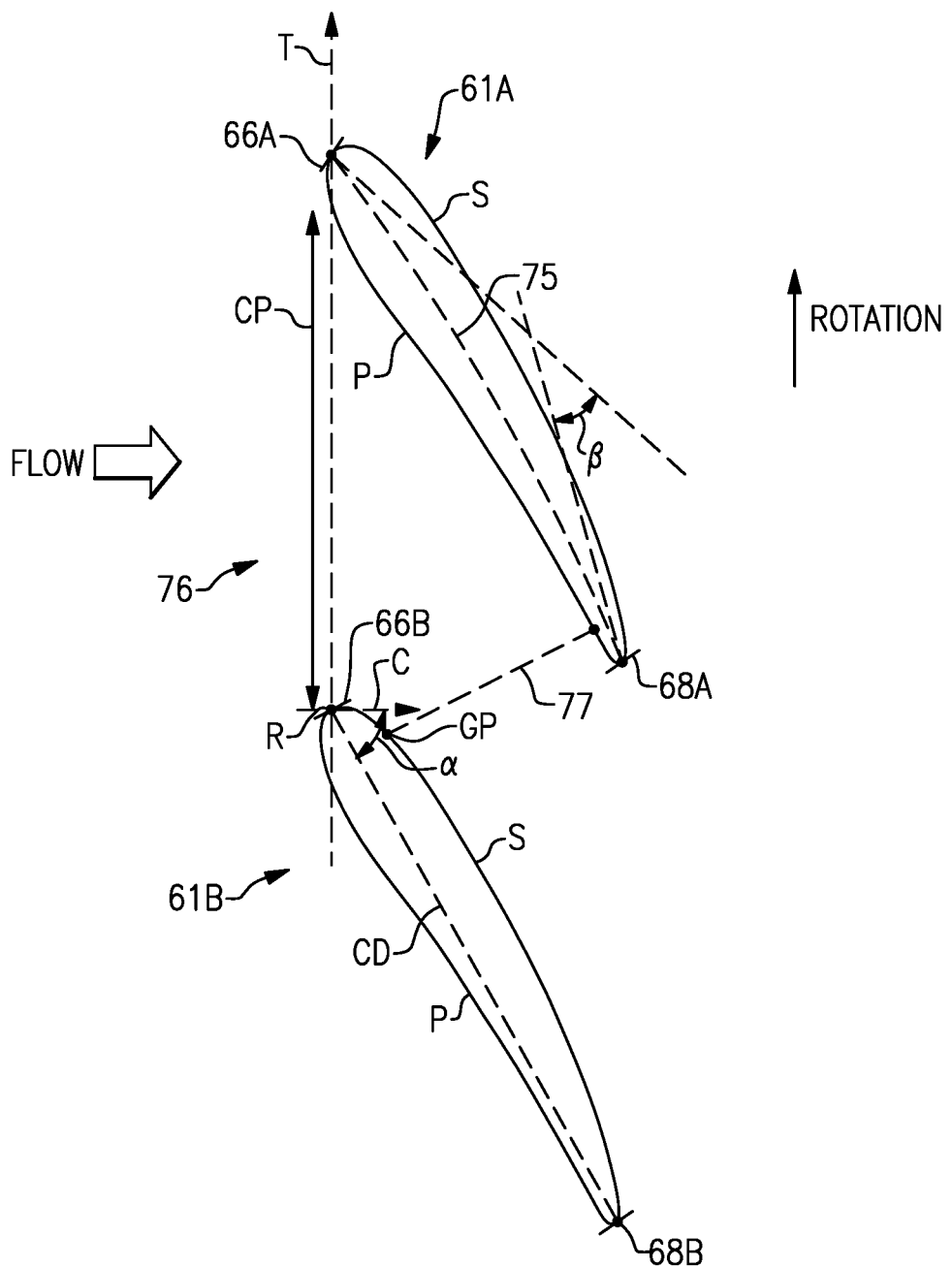
FIG. 4A illustrates a cross sectional view of adjacent airfoils according to an example.

FIG. 4A shows an isolated view of a pair of adjacent airfoils designated as leading airfoil 61A and following airfoil 61B at a first location, such as at a first span position or a location in the turbine section 28. The airfoils 61A, 61B of FIG. 4A may correspond to high lift airfoils, for example, which are discussed in more detail below. As shown, each airfoil 61A/61B is sectioned at a radial position between the root section 67 and the tip 64 (FIGS. 2 and 3). A chord dimension (CD), which is the length between the leading and trailing edges 66A/66B, 68A/68B of the airfoil 61A/61B, forms an angle, or stagger angle α, relative to the chordwise direction C or to a plane parallel to the engine's central longitudinal axis A (FIGS. 2 and 3). The chord dimension (CD) may vary along the span of the airfoil 61A/61B.

Each airfoil 61A/61B can have an asymmetrical cross-sectional profile characterized by a mean camber line 75. The mean camber line 75 extends between leading and trailing edges 66A/66B, 68A/68B to bisect a thickness of the airfoil 61 in the circumferential or thickness direction T.

Each airfoil 61A/61B defines a camber angle ($\beta$) defined by a tangential projection of the mean camber line 75 at the leading and trailing edges 66A/66B, 68A/68B. The camber angle ($\beta$) can differ at various span positions. For example, the camber angle ($\beta$) can decrease as span position increases. In some examples, the camber angle ($\beta$) is less than about 45 degrees, or more narrowly less than about 15 degrees, between the 70% span position and the 100% span position, which may be utilized with high lift airfoil geometries, for example. For the purposes of this disclosure, the term "about" means±3% of the stated value unless otherwise disclosed.

Figure 4B:
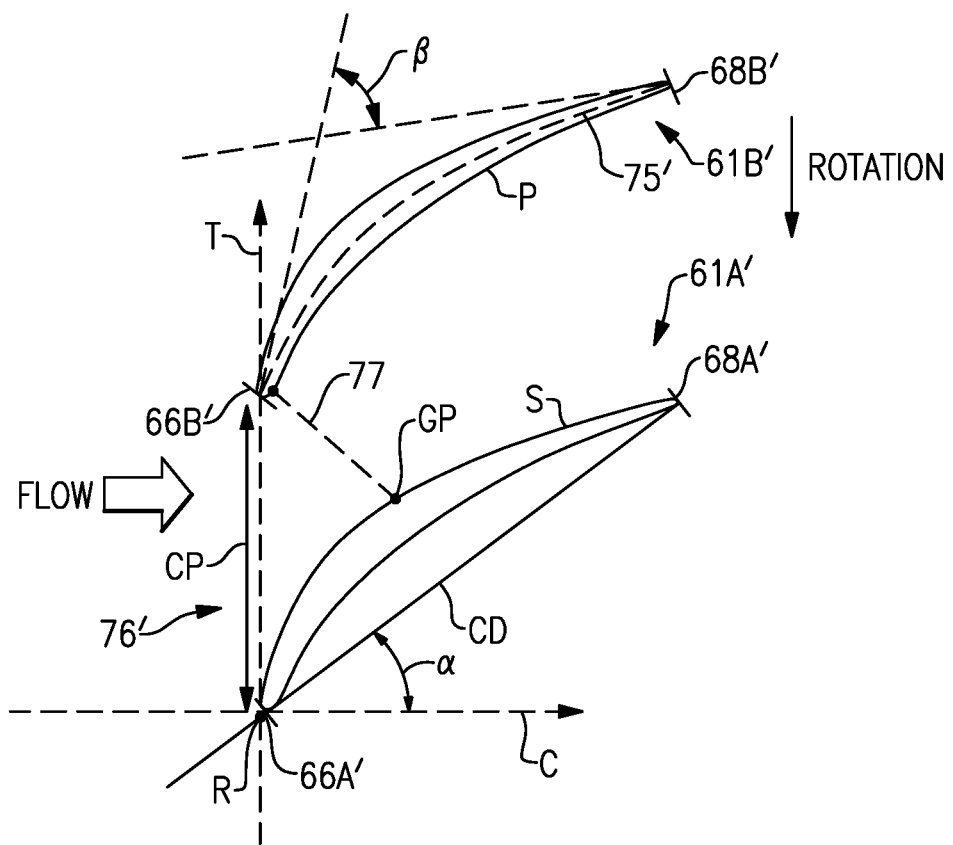
FIG. 4B illustrates a cross sectional view of adjacent airfoils according to another example.

The leading edges 66A, 66B or trailing edges 68A, 68B of the adjacent airfoils 61A, 61B are separated by a gap or circumferential pitch (CP) in the circumferential or thickness direction T to define an airfoil passage 76. Facing pressure and suction sides P, S of adjacent airfoils 61A, 61B define a throat 77. The throat 77 is defined as a minimum distance between the facing pressure and suction sides P, S of adjacent airfoils 61A, 61B at a respective span position (see FIG. 3). The throat 77 can include a component in the axial or chordwise direction C in addition to a component in the circumferential or thickness direction T. The minimum distance corresponds to a gauge point GP along surfaces of respective facing pressure and suction sides P, S of adjacent airfoils 61A, 61B. A location of the gauge point GP can vary depending on a geometry of the corresponding airfoils 61. In the illustrated example of FIG. 4A, the gauge point GP is defined with respect to the suction side S. FIG. 4B shows an isolated view of a pair of adjacent airfoils designated as leading airfoil 61A' and following airfoil 61B' at a second location, such as second span position, or at a location in the compressor section 24, for example.

In some examples, the airfoil 61 is a "high lift" airfoil. For the purposes of this disclosure, the term "high lift airfoil" means an airfoil design that has an airfoil shape that allows for reduced airfoil count due to its ability to extract more work than a conventional airfoil. High lift airfoils provide an improvement in efficiency and weight reduction. In using a high lift design, the airfoil stagnation point is shifted from a leading edge nose, where it is located on a conventional airfoil, to the pressure side towards the tip of the airfoil. In addition, the suction side gauge line, in which the gas Mach number is at the greatest, on a high lift airfoil can occur much closer to the leading edge nose than a conventional airfoil. An exemplary high lift airfoil is disclosed in U.S. patent application Ser. No. 14/767,768, entitled "Gas Turbine Engine High Lift Airfoil Cooling in Stagnation Zone," filed on Aug. 13, 2015 (now published as U.S. Publication No. 2016/0010463), the contents of which are incorporated herein by reference in their entirety.

In examples, a cross section of the airfoil 61 at a span position adjacent to the tip 64 is substantially thin and relatively long, and can have a relatively large amount of twist about a radial axis of the airfoil 61. For example, a maximum thickness of the airfoil 61 at span positions between 70% span and 100% span can be less than 25% of a maximum thickness of the airfoil 61 at 0% span, or more narrowly less than 10% of the maximum thickness of the airfoil 61 at 0% span. In other examples, the chord dimension (CD) of the airfoil 61 at span positions between 70% span and 100% span is greater than the chord dimension (CD) at 0% span, such as 125% or greater than the chord dimension (CD) at 0% span. Sections of example high lift airfoils are illustrated by airfoils 161, 261, 361, 461 (FIGS. 5B-C and 6-8). A localized region of the airfoil 61 between the leading edge 66 and the gauge point GP, including the suction side S of high lift airfoils, can be susceptible to distress due to exposure of relatively high pressures and/or temperatures along the core flow path C (FIG. 1), including oxidation, erosion, burnthrough and thermal-mechanical fatigue.

Figure 5A:
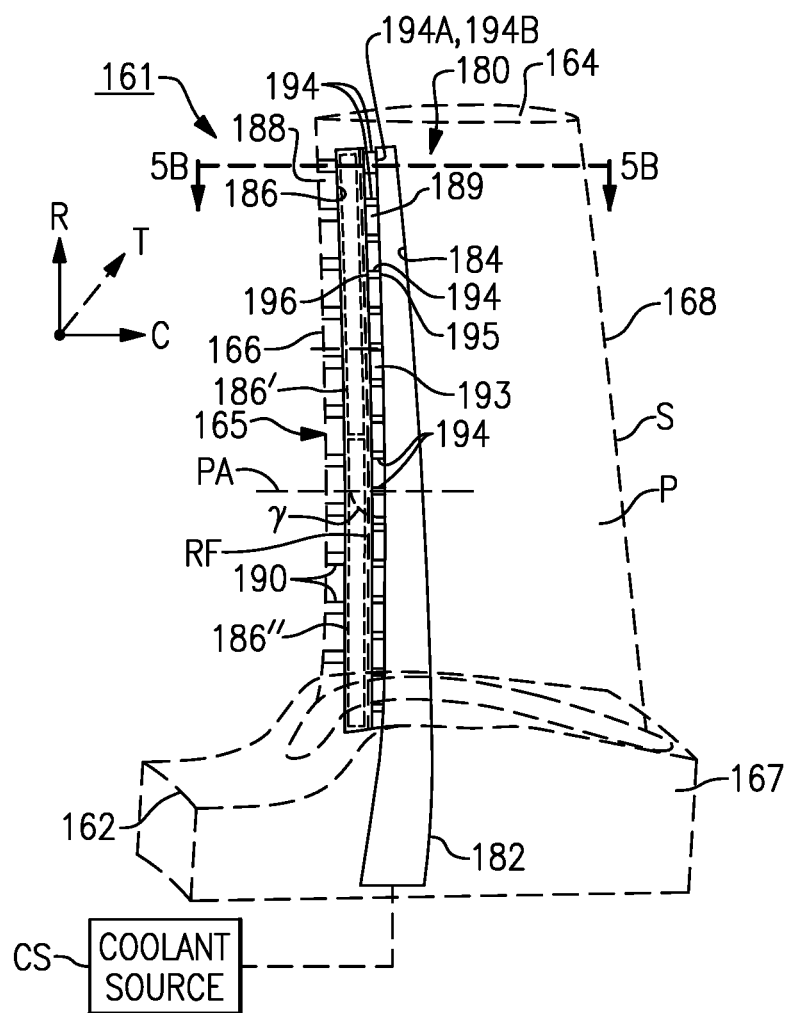
FIG. 5A illustrates a side view of a cooling arrangement with an airfoil shown in phantom.
Figure 5B:
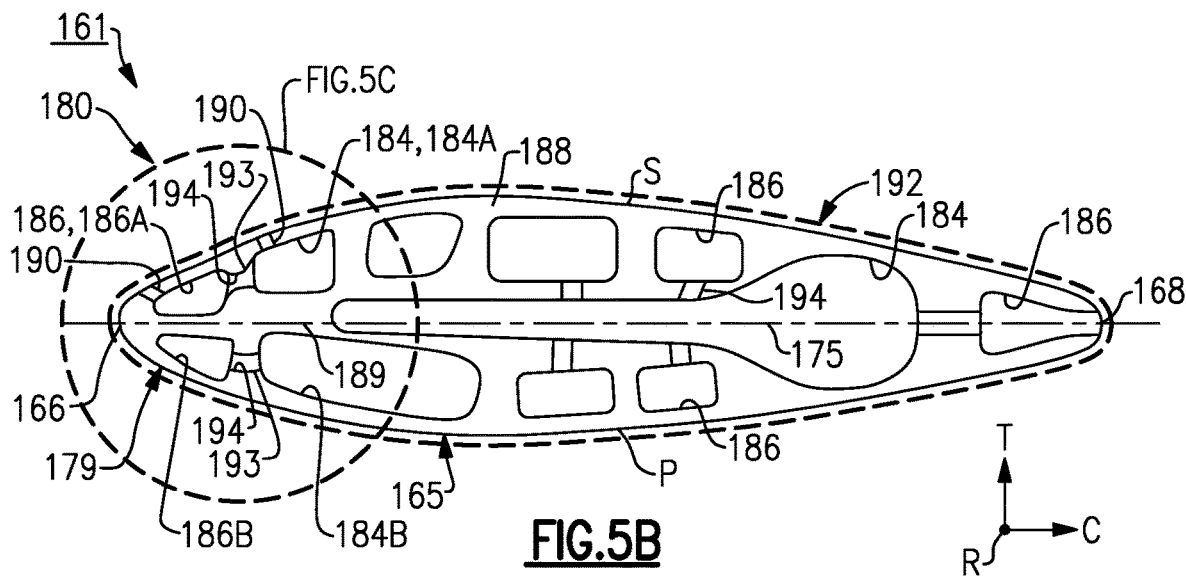
FIG. 5B illustrates a cross sectional view of the cooling arrangement of FIG. 5A along line 5B-5B.

FIGS. 5A and 5B illustrate an exemplary cooling arrangement 180 for an airfoil 161, such as the airfoil 61 of FIG. 2. Although the exemplary cooling arrangements discussed in the disclosure primarily refer to a compressor or turbine blade, the teachings herein can also be utilized for another portion of the engine 20 such as vane 70 of FIG. 2, for example.

At least one radial cooling passage 182 (only one shown for illustrative purposes) is provided between pressure and suction sides P, S in the thickness direction T. Each radial cooling passage 182 extends from a root section 167 through a platform 162 and toward a tip 164 to communicate coolant to various portions of the airfoil 161. Each radial cooling passage 182 is configured to receive coolant from a coolant source CS (shown schematically). Exemplary coolant sources CS can include bleed air from an upstream stage of the compressor section 24, bypass air from the bypass flow path B (FIG. 1), or a secondary cooling system aboard the aircraft, for example.

The cooling arrangement 180 includes one or more feeding cavities 184 and impingement cavities 186 extending in the radial direction R (only one feeding cavity 184 and one impingement cavity 186 shown in FIG. 5A for illustrative purposes). One of the radial passages 182 or another source can communicate coolant to each of the feeding cavities 184 for delivery to the impingement cavities 186.

The cavities 184, 186 can be formed in various locations of the airfoil 161. In some examples, the impingement cavity 186 is bounded by an external wall 188 of the airfoil 161. The external wall 188 defines pressure and suction sides P, S between leading and trailing edges 166, 168 of the airfoil section 165. The airfoil section 165 can include multiple feeding cavities 184 and/or impingement cavities 186 to provide cooling to various portions of the airfoil section 165. For example, a pair of impingement cavities 186 can be located at the leading edge 166, as shown in FIG. 5B. Impingement cavities 186 can be located at the trailing edge 168 or between the leading and trailing edges 166, 168, also shown in FIG. 5B.

The airfoil 161 may include one or more film cooling holes or passages 190 in fluid communication with the feeding cavities 184 and/or impingement cavities 186 to provide film cooling to various surfaces of the airfoil 161. The film cooling passages 190 may extend from a surface of the impingement cavity 186, for example. In some examples, the film cooling passages 190 are located within the external wall 188 at the leading edge 166, the trailing edge 168, or another location of the airfoil 161.

The airfoil 161 can include a thermal barrier coating (TBC) or coating system 192 (shown in dashed lines in FIG. 5B) on an exterior surface of the airfoil section 165 to reduce heat transfer between the gas path and the airfoil section 165. The thermal barrier coating 192 can include, but is not limited to, a ceramic material such as yttria-stabilized zirconia (YSZ). The thermal barrier coating 192 can further include a bond layer to facilitate adherence to the substrate.

One or more crossover passages 194 are located within internal wall 189 of the airfoil section 165, and can be arranged to provide directional or impingement cooling to relatively high heat load regions of the airfoil 161. The internal wall 189 includes one or more ribs 193 defined in a thickness of the airfoil that space apart or otherwise separate a respective feeding cavity 184 and impingement cavity 186 or multiples of either. Each rib 193 can define a reference plane RF extending in the spanwise or radial direction R along an adjacent surface of the respective impingement cavity 186. The reference plane RF can be transverse or perpendicular to mean camber line 175. The reference plane RF can be generally planar or can include a curvilinear component, for example. The reference plane RF can also include an axial twist between platform 162 and the tip 164.

Figure 5C:
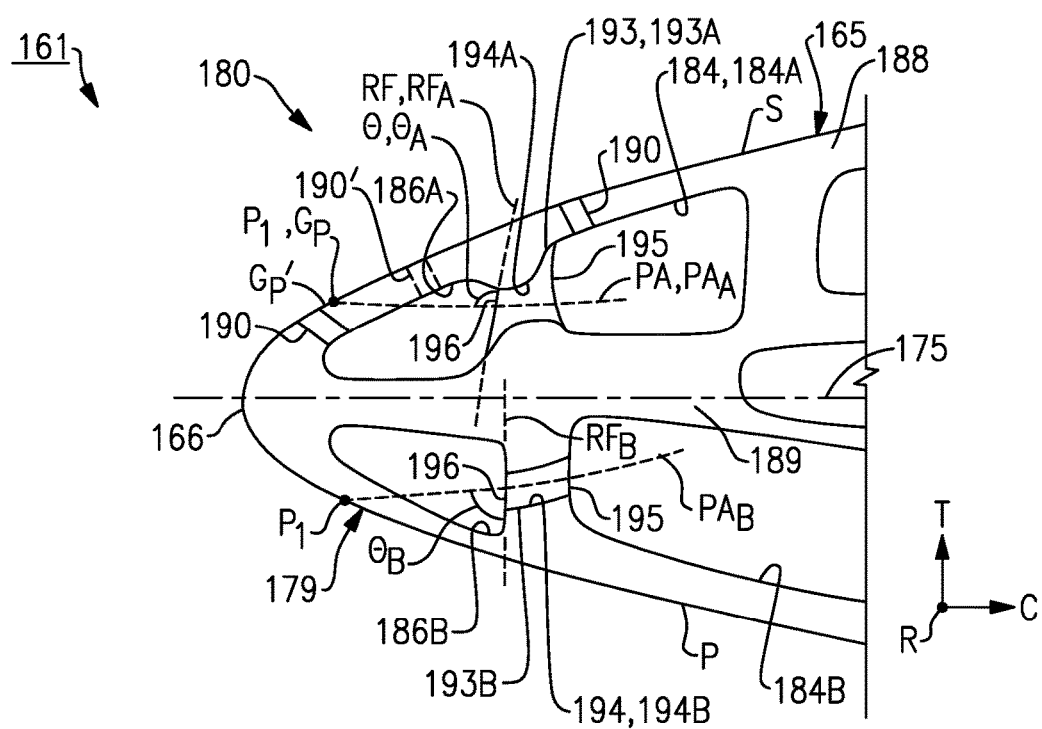
FIG. 5C illustrates selected portions of the cooling arrangement of FIG. 5B.

Referring to FIG. 5C, with continued reference to FIGS. 5A and 5B, each crossover passage 194 extends between an inlet port 195 and an outlet port 196 to connect a respective feeding cavity 184 and impingement cavity 186. In examples, each outlet port 196 of at least one, or more than one, of the crossover passages 194 is defined at a span position that is between an 70% span position and the 100% span position (see, e.g., crossover passages 194A, 194B of FIG. 5A), and can be arranged utilizing any of the techniques disclosed herein. Although only one set of crossover passages 194A, 194B is shown in FIG. 5, it should be appreciated that each of the impingement cavities 186A, 186B can be provided with a respective set of crossover passages 194A, 194B each including a plurality of crossover passages 194 at different span positions of the airfoil 161.

Each of the crossover passages 194 defines a passage axis PA that intersects a surface of the impingement cavity 186 and the feeding cavity 184. The passage axis PA can be substantially linear or can include curvilinear portions between the inlet port 195 and outlet port 196, and can intersect the external wall 188 at locations along a leading edge region 179 that defines the leading edge 166 of the airfoil 161. For the purposes of this disclosure, the term "leading edge region" includes a region of the airfoil section 165 from the leading edge 166 and within 20% of a distance along the external wall 188 between the leading and trailing edges 166, 168, unless otherwise disclosed.

The crossover passages 194 are arranged such that coolant provided to the feeding cavity 184 is thereafter communicated to the impingement cavity 186. The coolant is communicated to the impingement cavity 186 to selectively provide impingement cooling to one or more portions of the external wall 188 of the airfoil 161. One or more of the crossover passages 194 can be arranged such that the respective outlet port 196 is spaced apart from the external wall 188 (e.g., crossover passage 194B). The crossover passages 194 are shown in FIG. 5A as having a uniform distribution in the radial direction R. In other examples, the airfoil 161 includes a non-uniform distribution of at least some of the crossover passages 194 in the radial direction R. Although a particular quantity of crossover passages 194 is shown, the airfoil 161 can include fewer or more crossover passages 194.

Each passage axis PA defines a first or radial angle ($\gamma$) (FIG. 5A) relative to the reference plane RF. In some examples, the passage axis PA is substantially perpendicular to the reference plane RF, and the radial angle ($\gamma$) is approximately equal to 90 degrees such that the crossover passage 194 is substantially parallel with the engine axis A. In other examples, the passage axis PA is transverse to the reference plane RF, and radial angle ($\gamma$) is not equal to 90 degrees such that the crossover passage 194 is transverse to the engine axis A and slopes towards one of the platform 162 or the tip 164.

The passage axis PA can define a second or passage angle ($\theta$) (FIG. 5C) with respect to the reference plane RF such that the passage axis PA has a component that extends in the chordwise direction C and such that the crossover passage 194 ejects coolant onto surfaces of the impingement cavity 186 along the passage axis PA to cool a desired portion of the airfoil 161, such as portions of the external wall 188. The passage axis PA can include curvilinear portions between the inlet port 195 and outlet port 196, for example, but the passage angle ($\theta$) is defined by a linear projection of the passage axis PA from the intersection of the passage axis PA and the reference plane RF at the outlet port 196.

The crossover passages 194 feeding a common one of the impingement cavities 186 can have the same passage angle ($\theta$), or at least some or each of the passage angles ($\theta$) can differ to provide different cooling augmentation to different portions of the external wall 188 bounding the respective impingement cavity 186. The crossover passage 194 can be defined along various locations of the internal wall 189 or rib 193, and outlet port 196 can be defined along various locations relative to the reference plane RF, including toward the suction side S or the pressure side P.

The airfoil 161 includes first and second (or a pair of) impingement cavities 186A, 186B that are bounded by external wall 188 at the leading edge region 179, with no other impingement cavities being between the leading edge 166 and the cavities 186A, 186B. The cavities 186A, 186B are separate and distinct cavities that provide dedicated impingement cooling to different portions of the airfoil 161 along the leading edge region 179, such as adjacent the respective suction and pressure sides S, P. Feeding the impingement cavities 186A, 186B separately with cooling airflow can reduce a likelihood of the impingement cavity 186A adjacent the suction side S being supplied with more cooling airflow than necessary and a likelihood of the impingement cavity 186B adjacent the pressure side P being supplied with insufficient cooling airflow due to starvation, for example. The impingement cavities 186A, 186B can provide relatively greater wetted surface area as compared to a single impingement cavity of the same volume, and can improve uniformity of heat transfer between the cooling airflow and portions of the airfoil 161 along the leading edge region 179.

Each impingement cavity 186, including cavities 186A, 186B, can extend substantially along a span of the airfoil section 165. In other examples, one or more impingement cavities 186' can extend from the tip 164 toward the root section 167, and one or more impingement cavities 186" can extend from the platform 162 or root section 167 toward the tip 164, including any of the impingement cavities disclosed herein (one set of cavities 186' and 186" are shown in dashed line in FIG. 5A for illustrative purposes).

First and second feeding cavities 184A, 184B are separated from the impingement cavities 186A, 186B by the ribs 193A, 193B of the internal wall 189. A pair of crossover passages 194A, 194B within ribs 193A, 193B of the internal wall 189 connect the feeding cavities 184A, 184B with the respective impingement cavities 186A, 186B to supply cooling airflow. In the illustrated example, the feeding cavities 184A, 184B are separate and distinct cavities that each receive coolant from the coolant source CS (FIG. 5A). The impingement cavities 186A, 186B are not directly connected to the radial cooling passage 182 (FIG. 5A) or the coolant source CS and instead receive substantially all cooling airflow from the feeding cavities 184A, 184B. The crossover passages 194A, 194B can be sized to provide an adequate backflow margin to reduce a likelihood of ingestion of core air in core flow path C (FIG. 1) into impingement cavities 186A, 186B through cooling passages 190 or airflow from the impingement cavities 186A, 186B and into the feeding cavities 184A, 184B.

The passage angles ($\theta_A$, $\theta_B$) can be the same or can differ to eject cooling airflow on discrete portions of the external wall 188. In the illustrated example of FIG. 5C, the passage angles ($\theta_A$, $\theta_B$) are transverse to respective reference planes $RF_A$, $RF_B$ and are angled toward the suction and pressure sides S, P. Passage angle ($\theta_A$) of crossover passage 194A can be defined such that the passage axis $PA_A$ intersects a surface of impingement cavity 186A adjacent to the suction side S. Passage angle ($\theta_B$) of crossover passage 194B can be defined such that the passage axis $PA_B$ intersects a surface of impingement cavity 186B adjacent to the pressure side P. In other examples, passage angle ($\theta_A$) and/or passage angle ($\theta_B$) is substantially perpendicular to the respective reference planes $RF_A$, $RF_B$ or angled inwardly toward the mean camber line 175.

The passage angle ($\theta$) of at least some of the crossover passages 194 can change in the radial direction R. In some examples, the passage angle ($\theta$) of at least some or each of the crossover passages 194 changes in the radial direction R such that the passage angles ($\theta$) are generally progressively larger or smaller. In other examples, the crossover passages 194 are arranged such that the passage angles ($\theta$) increase as span position increases for each, or at least some of, the crossover passages 194. In yet other examples, the crossover passages 194 are arranged such that the passage angles ($\theta$) decrease as span position increases for each, or at least some of, the crossover passages 194.

The passage axis PA of at least some of the crossover passages 194 can intersect the external wall 188 at a respective intersection point P1 (FIG. 5C). The intersection point P1 may coincide with the respective gauge point GP, or may be defined aft of gauge point GP' (FIG. 5C). Said differently, the intersection point P1 can be defined at a position between the trailing edge 168 and the gauge point GP, inclusive of the gauge point GP. In some examples, the intersection point P1 is within ±10% of a distance from the gauge point GP with respect to a length between the gauge point GP and one of the leading and trailing edges 166, 168 along an external wall perimeter of the airfoil 161.

The passage axis PA of at least one, or each, of the crossover passages 194 is arranged at a corresponding passage angle (θ) such that the passage axis PA of the respective crossover passage 194 intersects the external wall 188 at a location between respective gauge point GP and an aftmost location of the impingement cavity 186 with respect to the chordwise direction C. In the illustrated example of FIG. 5C, the impingement cavity 186 is free of any film cooling passages 190 aft of the gauge point GP. In alternative examples, the impingement cavity 186 includes at least one film cooling passage 190' (shown in dashed lines in FIG. 5C) aft of the gauge point GP and/or intersection point P1.

The arrangement of the impingement cavities 186 and crossover passages 194 utilizing the teachings herein can provide dedicated cooling augmentation to adjacent portions of the external wall 188 without the need for introducing film cooling passages downstream of the gauge point GP and/or intersection point P1 which can result in aerodynamic losses.

Figure 6:
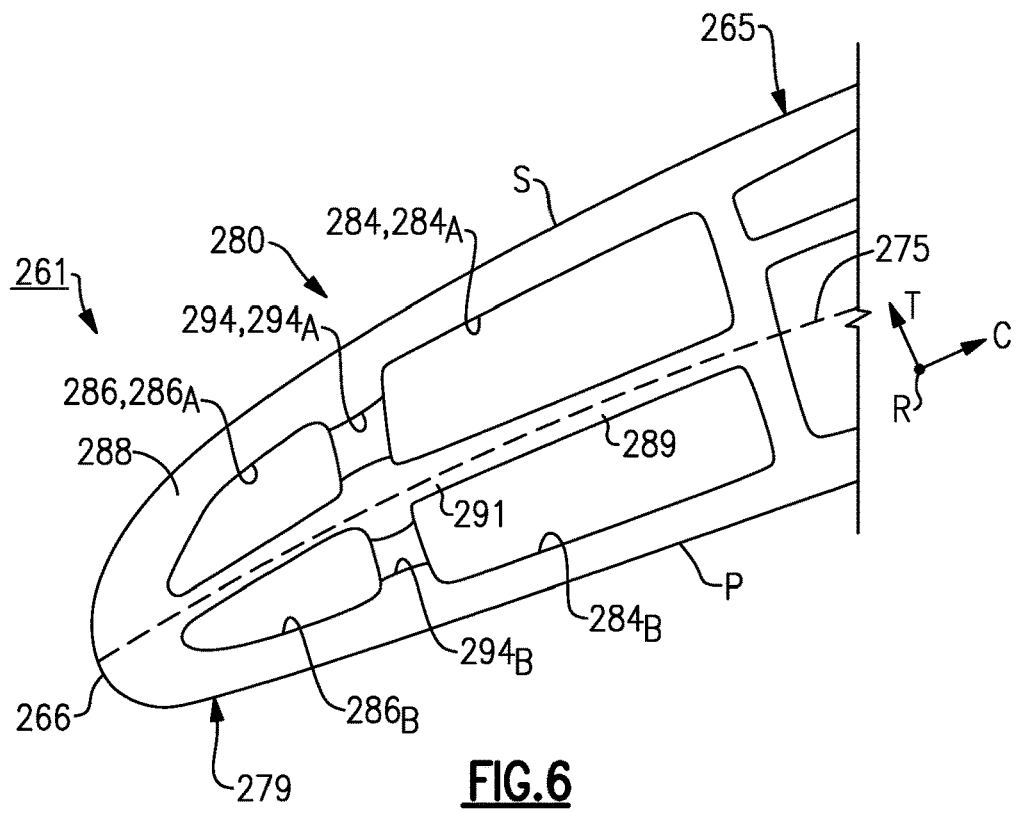
FIG. 6 illustrates an exemplary cooling arrangement according to another example.

FIG. 6 illustrates a cooling arrangement 280 for an airfoil 261 according to another example. Airfoil section 265 includes a pair of impingement cavities 286A, 286B defined in a leading edge region 279 that are supplied with cooling airflow from a pair of feeding cavities 284A, 284B. As shown, the airfoil 261 along the leading edge region 279 is substantially symmetrical about mean camber line 275 such that the impingement cavities 286A, 286B have substantially the same geometry and volume and such that the feeding cavities 284A, 284B have substantially the same geometry and volume. A length of rib 291 that separates cavities 284A, 286A from cavities 284B, 286B follows the mean camber line 275. Crossover passages 294A, 294B that connect the impingement cavities 286A, 286B and the respective feeding cavities 284A, 284B are spaced apart from the mean camber line 275.

Figure 7:
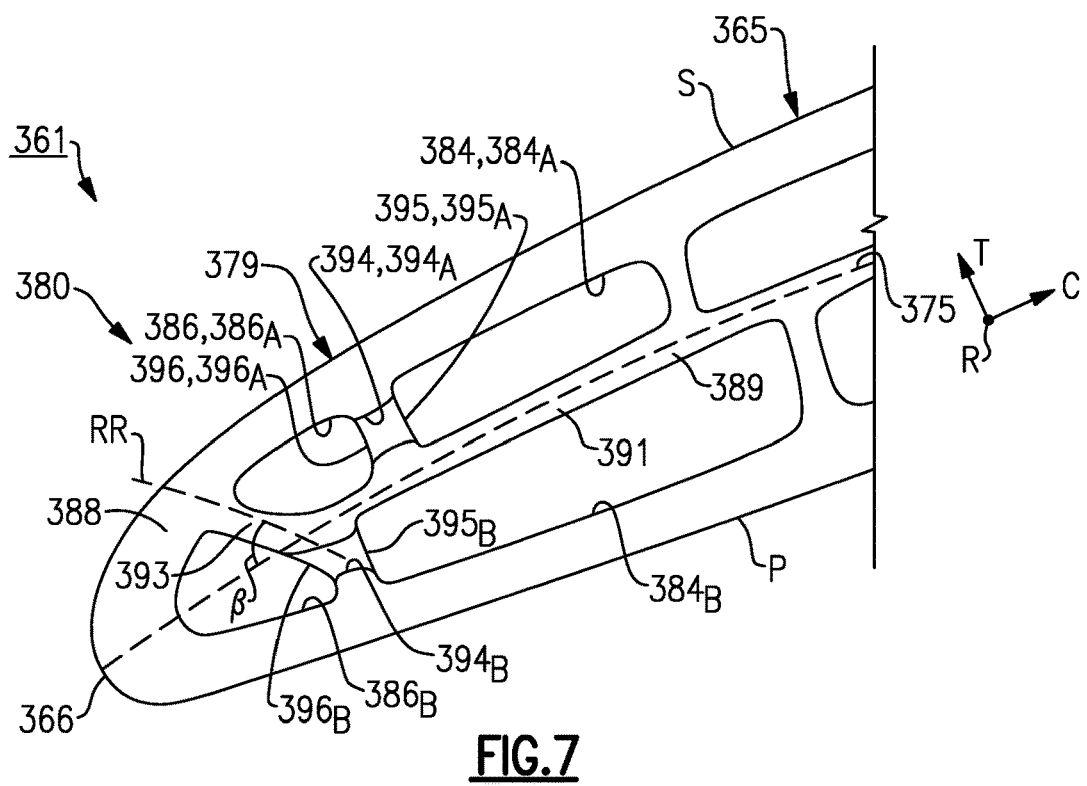
FIG. 7 illustrates another exemplary cooling arrangement.

FIG. 7 illustrates a cooling arrangement 380 for an airfoil 361 according to yet another example. Airfoil section 365 includes a pair of impingement cavities 386A, 386B defined in a leading edge region 379 that are supplied with cooling airflow from a pair of feeding cavities 384A, 384B. The impingement cavities 386A, 386B are arranged such that mean camber line 375 intersects impingement cavity 386B and is spaced apart from impingement cavity 386A.

A rib 393 in the internal wall 389 separates the impingement cavities 386A, 386B. A length of the rib 393 extends along a reference plane RR that is substantially transverse to the mean camber line 375, with the reference plane RR intersecting at least one of the pressure and suction sides P, S (e.g., suction side S) along the leading edge region 379. The rib 393 can provide reinforcement within a foreign object debris (FOD) region or impact area of the airfoil section 365. The FOD region can be susceptible to an increased risk of impact by FOD relative to other portions of the airfoil 361. The reference plane RR intersects the mean camber line 375 to define a third or rib angle (β). In examples, the rib angle (β) is between 30 and 80 degrees, or more narrowly between 45 and 60 degrees. The rib 393 can be defined such that inlet 395B and outlet 396B of crossover passage 394B are forward of inlet 395A and outlet 396A of crossover passage 394A with respect to the chordwise direction C.

Impingement cavity 386B defines a first volume. Impingement cavity 386A defines a second, different volume. In some examples, the second volume of impingement cavity 386A is less than about 75%, or more narrowly less than about 50% or half of the first volume of the impingement cavity 386B. The different volumes can improve distribution of cooling airflow to the respective impingement cavities 386A, 386B based on cooling demands adjacent the suction and pressure S, P sides of the airfoil 361.

Figure 8:
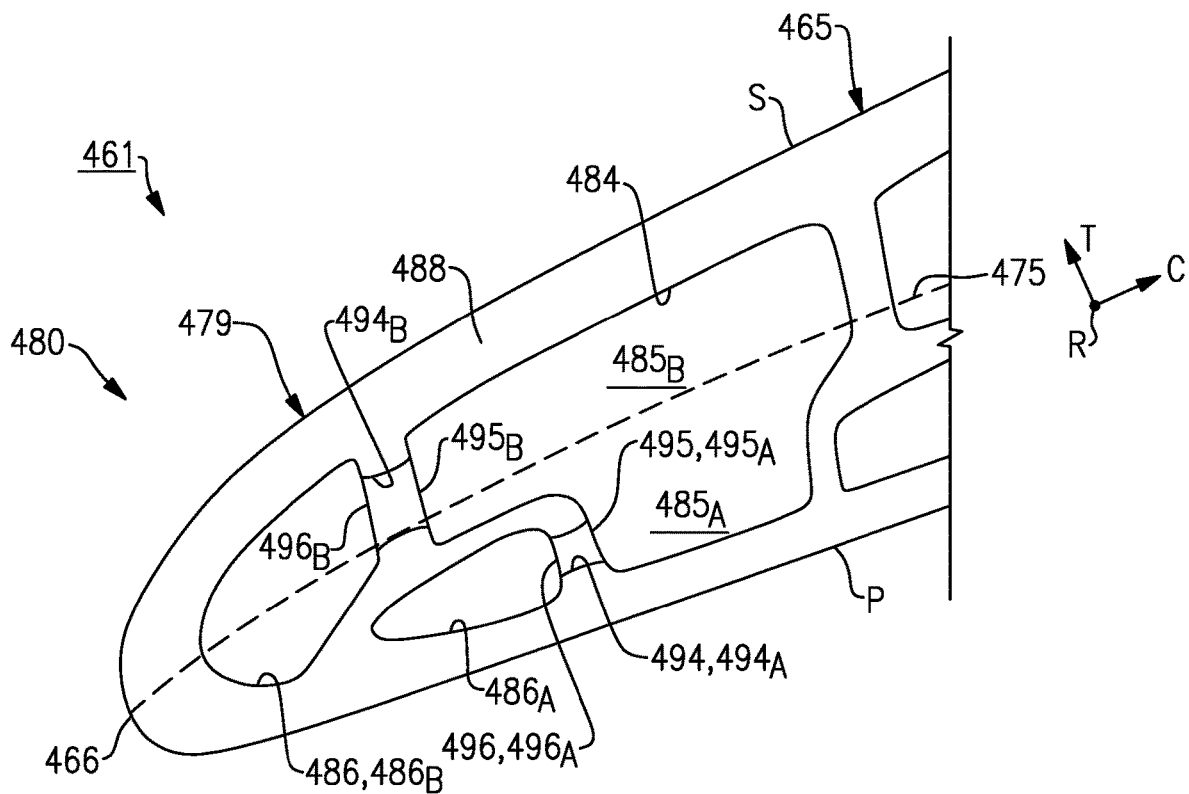
FIG. 8 illustrates yet another exemplary cooling arrangement.

FIG. 8 illustrates a cooling arrangement 480 for an airfoil 461 according to another example. Airfoil section 465 includes a pair of impingement cavities 486A, 486B defined in a leading edge region 479 that are supplied with cooling airflow from a common feeding cavity 484. The impingement cavities 486A, 486B are arranged such that mean camber line 475 intersects impingement cavity 486B and the common feeding cavity 484 but is spaced apart from impingement cavity 486A.

The common feeding cavity 484 can be formed from a stepped core to define different regions 485A, 485B that are joined together at a location adjacent the mean camber line 475 and that feed cooling airflow to respective inlets 495A, 495B, for example. In the illustrated example, region 485A extends a different or lesser distance than region 485B with respect to the chordwise direction C. The different regions 485A, 485B provide for different positioning of the impingement cavities 486A, 486B, including within leading edge region 479 that can have a relatively narrow thickness or profile in the thickness direction T. Both inlet 495B and outlet 496B of crossover passage 494B are forward of inlet 495A and outlet 496A of crossover passage 494A with respect to the chordwise direction C. In other examples, outlet 496B but not inlet 495B is forward of inlet 495A and outlet 496A.

Figure 9:
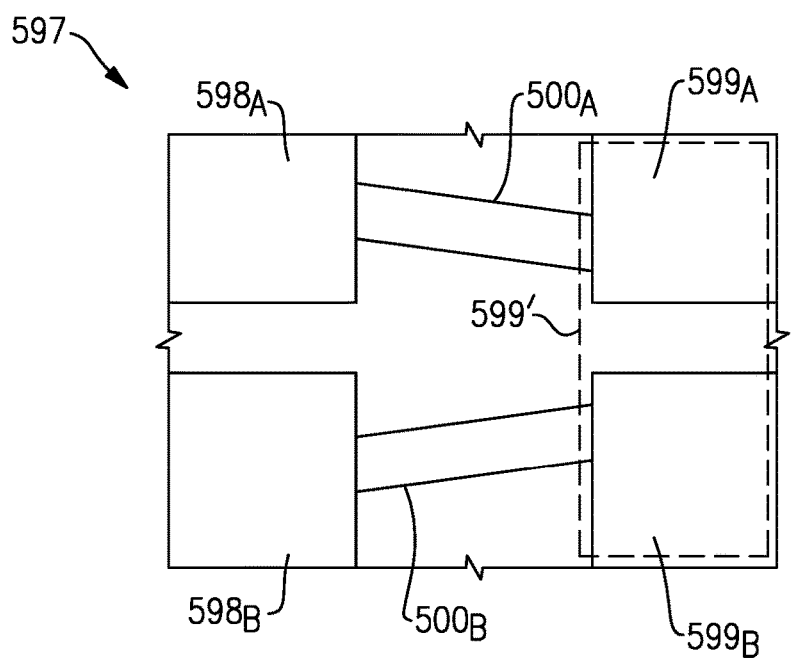
FIG. 9 illustrates a core for a cooling arrangement.

FIG. 9 illustrates a portion of a core 597 according to an example. The core 597 can be formed or made via casting, additive, machining, or any method that can produce the geometric shape. The core 597 can be utilized in an additive manufacturing process and then used in a casting process, for example, to form the various portions of the cooling arrangements 180/280/380/480.

The core 597 includes a first portion 598A corresponding to the first impingement cavity 186A/286A/386A/486A, and a second portion 598B corresponding to the second impingement cavity 186B/286B/386B/486B, for example. In examples, the first portion 598A defines a first volume, and the second portion 598B defines a second, different volume including any of the volumes discussed herein.

The core 597 includes a third portion 599A corresponding to the first feeding cavity 184A/284A/384A/484A, and a fourth portion 599B corresponding to the second feeding cavity 184B/284B/384B/484B, for example. In embodiments, the third and fourth portions 599A, 599B are portions of a common portion 599' (shown in dashed lines) that corresponds to common feeding cavity 484, for example.

Crossover connectors 500A, 500B, which may correspond to one or more of the crossover passages 194/294/394/494, couple or otherwise connect the first and third portions 598A, 599A and the second and fourth portions 598B, 599B, respectively. The crossover connectors 500A, 500B can define respective first and second sets of crossover passages 194A/294A/394A/494A, 194B/294B/394B/494B at different span positions of the airfoil 161/261/361/461. The crossover connectors 500A, 500B can be arranged to define a passage angle (θ) according to any of the corresponding crossover passages 194/294/394/494 disclosed herein.

The cooling arrangements 180/280/380/480 disclosed herein can improve cooling augmentation to selected portions of the airfoil or vane, including areas susceptible to distress, and can improve airfoil durability and component life. Airfoil designs including high lift airfoils can receive improved impingement cooling in the leading edge region, for example. The cooling arrangements 180/280/380/480 can also improve efficiency of the engine 20 due to reducing cooling supply demands, for example.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section having an internal wall and an external wall, the external wall defining pressure and suction sides extending in a chordwise direction between a leading edge and a trailing edge, and the airfoil section extending in a spanwise direction from a 0% span position to a 100% span position;
a first impingement cavity and a second impingement cavity bounded by the external wall at a leading edge region that defines the leading edge;
a first feeding cavity separated from the first impingement cavity and from the second impingement cavity by the internal wall;
a first crossover passage within the internal wall that connects the first impingement cavity and the first feeding cavity, wherein the first crossover passage defines a first passage axis that intersects a surface of the first impingement cavity; and
a second crossover passage within the internal wall connected to the second impingement cavity, wherein the second crossover passage defines a second passage axis that intersects a surface of the second impingement cavity;
wherein the airfoil section defines a mean camber line extending between the leading and trailing edges to bisect a thickness of the airfoil section; and
wherein the airfoil is a high lift airfoil, a camber angle is defined by a tangential projection of the mean camber line at the leading and trailing edges, and the camber angle is less than 15 degrees between a 70% span position and the 100% span position.

2. The airfoil as recited in claim 1, wherein the second crossover passage connects the second impingement cavity and a second feeding cavity, the second feeding cavity separated from the first impingement cavity and from the second impingement cavity by the internal wall.

3. The airfoil as recited in claim 2, wherein:
the first crossover passage extends between a first inlet and a first outlet, the second crossover passage extends between a second inlet and a second outlet, and the first inlet is forward of the second outlet with respect to the chordwise direction; and
the second crossover passage connects the second impingement cavity and the first feeding cavity, and the first outlet is forward of the second inlet with respect to the chordwise direction.

4. The airfoil as recited in claim 3, a rib separating the first impingement cavity and the second impingement cavity is transverse to the mean camber line such that the mean camber line intersects the first impingement cavity.

5. The airfoil as recited in claim 4, wherein the rib defines the first inlet and the first outlet, and the rib is spaced apart from the second inlet and the second outlet.

6. The airfoil as recited in claim 2, wherein:
the airfoil is a turbine blade;
a maximum thickness of the airfoil section at span positions between the 70% span and 100% span positions is less than 10% of a maximum thickness of the airfoil section at the 0% span position; and
a chord dimension of the airfoil section at span positions between the 70% span and 100% span positions is equal to or greater than 125% of a chord dimension of the airfoil section at the 0% span position, the chord dimension defined as a length between the leading and trailing edges at the respective span position.

7. The airfoil as recited in claim 6, wherein:
the first crossover passage extends between a first inlet and a first outlet, the second crossover passage extends between a second inlet and a second outlet, and the first inlet is forward of the second outlet with respect to the chordwise direction;
the second crossover passage connects the second impingement cavity and the first feeding cavity, and the first outlet is forward of the second inlet with respect to the chordwise direction;
the first and second inlets and the first and second outlets are defined at a span position between the 70% span and 100% span positions; and
the second impingement cavity separates the first impingement cavity and the second feeding cavity such that the first and second impingement cavities extend forward of the first and second feeding cavities with respect to the chordwise direction.

8. The airfoil as recited in claim 1, wherein the first passage axis intersects the surface of the first impingement cavity adjacent to the pressure side, and the second passage axis intersects the surface of the second impingement cavity adjacent to the suction side.

9. The airfoil as recited in claim 1, wherein the first crossover passage extends between a first inlet and a first outlet, the second crossover passage extends between a second inlet and a second outlet, and the first inlet is forward of the second outlet with respect to the chordwise direction.

10. The airfoil as recited in claim 9, wherein the second crossover passage connects the second impingement cavity and the second feeding cavity, and the first outlet is forward of the second inlet with respect to the chordwise direction.

11. The airfoil as recited in claim 1, wherein the first impingement cavity defines a first volume and the second impingement cavity defines a second volume that is less than the first volume.

12. The airfoil as recited in claim 1, wherein each of an outlet of the first crossover passage and an outlet of the second crossover passage is defined at a span position that is between an 70% span position and the 100% span position.

13. The airfoil as recited in claim 1, wherein the airfoil is a turbine blade.

14. The airfoil as recited in claim 1, wherein a rib separating the first impingement cavity and the second impingement cavity is transverse to the mean camber line.

15. A core for an airfoil, comprising:
a first portion corresponding to a first impingement cavity of a leading edge region of a high lift airfoil extending between in a chordwise direction between the leading edge and a trailing edge;
a second portion corresponding to a second impingement cavity of the leading edge region of the airfoil;
a third portion corresponding to a first feeding cavity of the airfoil;
a fourth portion corresponding to a second feeding cavity of the airfoil;
a first set of connectors coupling the first portion and the third portion, the first set of connectors corresponding to a first set of crossover passages of the airfoil; and
a second set of connectors coupling the second portion and the fourth portion, the second set of connectors corresponding to a second set of crossover passages of the airfoil; and
wherein the second portion separates the first portion and the third portion such that the first and second portions extend forward of the third and fourth portions with respect to the chordwise direction.

16. The core as recited in claim 15, wherein the first portion defines a first volume and the second portion defines a second volume that is less than the first volume.

17. The core for an airfoil as recited in claim 15, wherein the airfoil is a turbine airfoil.

18. A gas turbine engine, comprising:
an array of airfoils circumferentially distributed about an engine axis, each airfoil of the array of airfoils is a high lift airfoil including an airfoil section having an internal wall and an external wall, the external wall defining pressure and suction sides extending in a chordwise direction between a leading edge and a trailing edge, and the airfoil section extending in a spanwise direction from a 0% span position to a 100% span position; and
wherein the airfoil section comprises:
a first impingement cavity and a second impingement cavity bounded by the external wall at a leading edge region that defines the leading edge;
a first feeding cavity and a second feeding cavity separated from the first impingement cavity and from the second impingement cavity by the internal wall;
a first set of crossover passages within the internal wall that connect the first impingement cavity and the first feeding cavity, wherein each passage of the first set of crossover passages defines a first passage axis that intersects a surface of the first impingement cavity; and
a second set of crossover passages within the internal wall that connect the second impingement cavity and the second feeding cavity, wherein each passage of the second set of crossover passages defines a second passage axis that intersects a surface of the second impingement cavity;
wherein the airfoil section defines a mean camber line extending between the leading and trailing edges to bisect a thickness of the airfoil section; and
wherein a camber angle is defined by a tangential projection of the mean camber line at the leading and trailing edges, and the camber angle is less than 15 degrees between a 70% span position and the 100% span position.

19. The gas turbine engine as recited in claim 18, comprising a compressor section and a turbine section, wherein the array of airfoils are located in at least one of the compressor section and the turbine section.

20. The gas turbine engine as recited in claim 19, wherein the array of airfoils are rotatable blades.

21. The gas turbine engine as recited in claim 18, wherein each passage of the first set of crossover passages extends between a first inlet and a first outlet, each passage of the second set of crossover passages extends between a second inlet and a second outlet, and both the first inlet and the first outlet are forward of the second outlet with respect to the chordwise direction.

22. The gas turbine engine as recited in claim 18, wherein the first impingement cavity defines a first volume and the second impingement cavity defines a second volume that is less than the first volume.

* * * * *